(12) United States Patent
Itoga

(10) Patent No.: US 7,874,581 B2
(45) Date of Patent: Jan. 25, 2011

(54) VEHICLE-OCCUPANT RESTRAINT SYSTEM

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 342 days.

(21) Appl. No.: 12/086,084

(22) PCT Filed: Oct. 27, 2006

(86) PCT No.: PCT/JP2006/321487

§ 371 (c)(1),
(2), (4) Date: Jun. 5, 2008

(87) PCT Pub. No.: WO2007/069398

PCT Pub. Date: Jun. 21, 2007

(65) Prior Publication Data

US 2009/0284065 A1 Nov. 19, 2009

(30) Foreign Application Priority Data

Dec. 16, 2005 (JP) .............................. 2005-363692

(51) Int. Cl.
*B60R 21/18* (2006.01)
*B60R 22/22* (2006.01)
*B60R 22/24* (2006.01)
*B60R 22/26* (2006.01)
(52) U.S. Cl. ...................... 280/733; 280/801.1; 297/482
(58) Field of Classification Search ................. 280/733, 280/801.2, 801.1, 808; 297/482, 468, 483
See application file for complete search history.

(56) References Cited

U.S. PATENT DOCUMENTS

| | | | | |
|---|---|---|---|---|
| 4,451,087 A | * | 5/1984 | Tamamushi | ................. 297/468 |
| 4,611,854 A | * | 9/1986 | Pfeiffer | ...................... 297/468 |
| 4,682,790 A | * | 7/1987 | Katsuno et al. | .......... 280/801.1 |
| 5,732,974 A | * | 3/1998 | Sayles | ........................ 280/805 |
| 6,033,030 A | * | 3/2000 | Valasin | ...................... 297/483 |
| 6,286,860 B1 | * | 9/2001 | Adomeit et al. | ............. 280/733 |
| 2005/0184491 A1 | * | 8/2005 | Itoga | ....................... 280/730.1 |
| 2005/0189749 A1 | * | 9/2005 | Itaoga et al. | ................. 280/733 |

FOREIGN PATENT DOCUMENTS

| | | |
|---|---|---|
| JP | S61-169352 | 7/1986 |
| JP | H06-127334 | 5/1994 |
| JP | H11-165604 A | 6/1999 |

(Continued)

*Primary Examiner*—Paul N Dickson
*Assistant Examiner*—Keith Frisby
(74) *Attorney, Agent, or Firm*—Manabu Kanesaka

(57) ABSTRACT

A vehicle-occupant restraint system includes a base attached to a vehicle part, an anchor attached to the base swingably in a front-back direction of a vehicle, an inflator attached to the base or anchor, and a lap belt attached to the anchor at one end thereof and including an inflatable part connected to the inflator. A first cover is attached to the vehicle part and has an upper opening through which the lap belt passes to be connected to the anchor. A second cover covers the upper opening and a part of the lap belt. The second cover has an upper flange and a lower flange to define a space therebetween so that a marginal part of the upper opening is interposed therebetween. The space increases toward a front side of the second cover so that the second cover is swingable in the front-back direction.

6 Claims, 12 Drawing Sheets

FOREIGN PATENT DOCUMENTS

| | | |
|---|---|---|
| JP | H11-170949 A | 6/1999 |
| JP | H11-170950 A | 6/1999 |
| JP | H11-268608 A | 10/1999 |
| JP | H11-268609 A | 10/1999 |
| JP | 2002-145002 A | 5/2002 |
| JP | 2003-312439 A | 11/2003 |
| JP | 2004-351948 | 12/2004 |
| JP | 2005-239055 | 9/2005 |
| JP | 2005271888 A * | 10/2005 |
| WO | WO 01/36235 | 5/2001 |

* cited by examiner

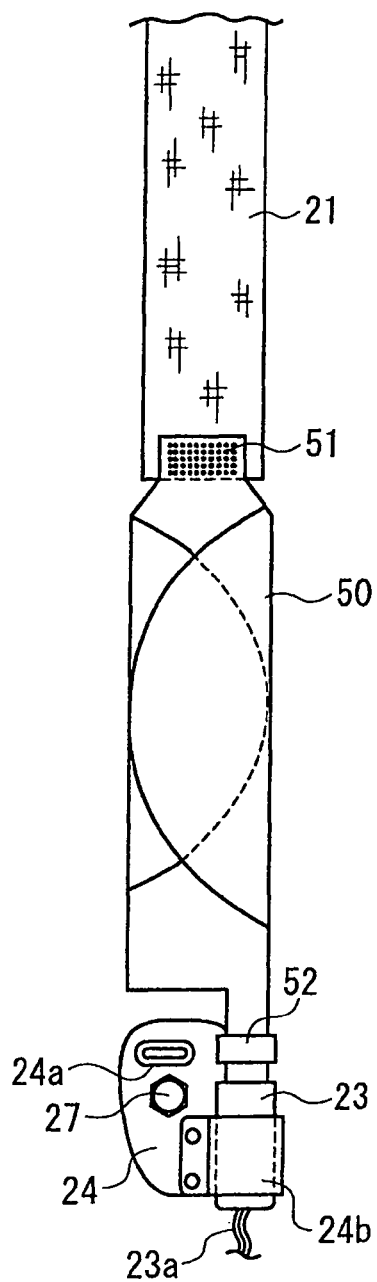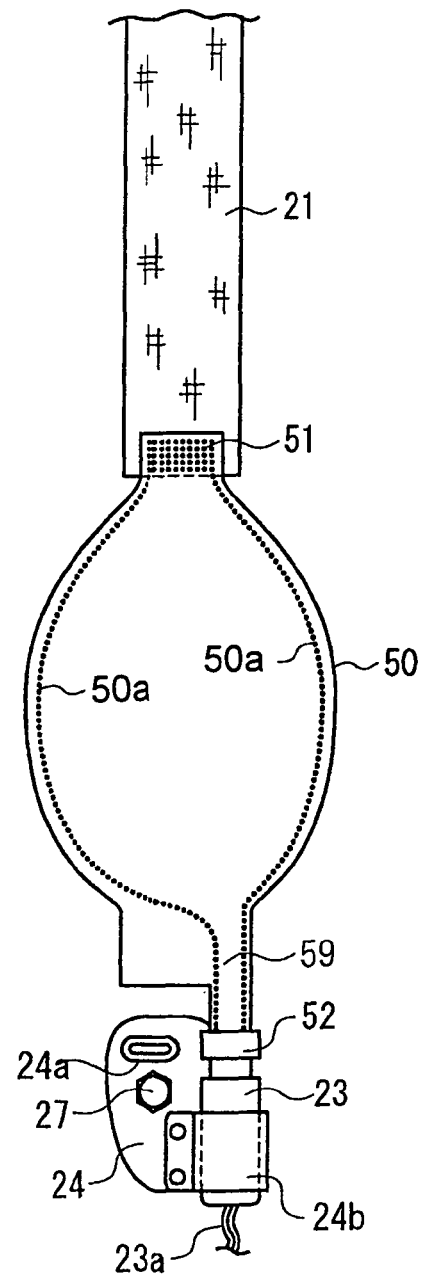

VEHICLE-OCCUPANT RESTRAINT SYSTEM

TECHNICAL FIELD

The present invention relates to a vehicle-occupant restraint system having a lap belt including an inflatable part inflatable when a vehicle collision occurs.

BACKGROUND ART

A structure is described in FIG. 2 of WO01/036235 (PCT Japanese Translation Patent Publication No. 2003-525797), in which a retractor is arranged on a vehicle floor and the end of an inflatable lap belt is retracted around the retractor. In this conventional example, an inflator is arranged on the vehicle floor and a gas is introduced to the lap belt via a special structure called a plenum.

[Patent Document 1] PCT Japanese Translation Patent Publication No. 2003-525797

In the above-mentioned PCT Japanese Translation Patent Publication No. 2003-525797, the special member called the plenum is used so as to have a complicated structure and high cost. The plenum is also bulky and the degree of freedom in arrangement is low.

DISCLOSURE OF INVENTION

It is an object of the present invention to provide a vehicle-occupant restraint system, in which a gas in an inflator is to be introduced into an inflatable part of a lap belt from an end of the lap belt, capable of simplifying the attaching the end of the lap belt and the inflator to a vehicle body side member. It is another object of the present invention to provide the vehicle-occupant restraint system, in which an anchor is swingable along with the swinging of the lap belt.

A vehicle-occupant restraint system according to the present invention includes a lap belt including an inflatable part, into which gas is introduced from its one end, and an inflator configured to inflate the inflatable part, in which the one end of the lap belt is attached, via an anchor, to an anchor-attaching part of a vehicle body or a seat, and the anchor is attached swingably about the anchor-attaching part within a predetermined angular range.

A projection may be provided in one of the anchor and the anchor-attaching part while an arc-shaped part to be engaged with the projection may be provided in the other, so that the anchor may be swingable within the movable range of the projection in the arc-shaped part.

The inflator may be fixed to the anchor.

The anchor may be covered with a cover, and the cover may swing integrally with the anchor.

The anchor-attaching part may be provided in one of a B pillar, a seat frame, and a vehicle chamber floor of the vehicle body.

BRIEF DESCRIPTION OF THE DRAWINGS

FIGS. 6a and 6b are sectional views at the line VI-VI of FIG. 3, in which FIG. 6a shows a lap belt in the non-inflation state and FIG. 6b shows the lap belt in the inflation state.

FIGS. 8a and 8b are explanatory views illustrating the internal structure of the lap bag.

FIGS. 9a and 9b are perspective views of a vehicle seat having a vehicle-occupant restraint system according to another embodiment, in which FIG. 9a shows a lap belt in the non-inflation state and FIG. 9b shows the lap belt in the inflation state.

FIG. 10 is a partially enlarged explanatory views illustrating FIG. 9a.

DETAILED DESCRIPTION

In a vehicle-occupant restraint system according to the present invention, gas of an inflator is introduced into a lap belt inflatable part from an end of the lap belt. The end of the lap belt is attached, via an anchor, to an anchor-attaching part provided in a B pillar, a seat frame, or a vehicle chamber floor, simplifying the attaching it to the B pillar, the seat frame, or the vehicle chamber floor.

According to the present invention, since the anchor is swingable about the anchor-attaching part within a predetermined angular range, the anchor swings by following the swing of the lap belt due to the shift of the seat in the front-back direction or a posture change of an occupant (bending forward, for example). Hence, the load of the lap belt produced in the vicinity of the anchor-attaching part is alleviated, so that the required level of the wear resistance, etc., is relaxed.

According to the present invention, the projection provided in one of the anchor and the anchor-attaching part may be brought into engagement with the arc-shaped part provided in the other, so that the swingable range of the anchor may be restricted, simplifying such configurations of the system and reducing cost.

In the vehicle-occupant restraint system according to the present invention, when a collision (including a side impact according to the present invention or may also include a lateral turning) of the vehicle is detected or foreknown by the detection sensor or the foreknowing sensor provided in the vehicle, for example, on the basis of the detection signal or the foreknown signal from the sensor, the inflator is started for discharging gas so that the gas from the inflator is introduced into the inflatable part so as to inflate the inflatable part, thereby restraining an occupant to the seat and absorbing the impact applied to the occupant with the inflated inflatable part.

By fixing the inflator to the anchor, the attachment of the inflator to the B pillar or the vehicle chamber floor is simplified.

By covering the anchor and further the inflator with a cover, the appearance is also improved.

Embodiments of the present invention will be described below with reference to the drawings.

Figure 1:
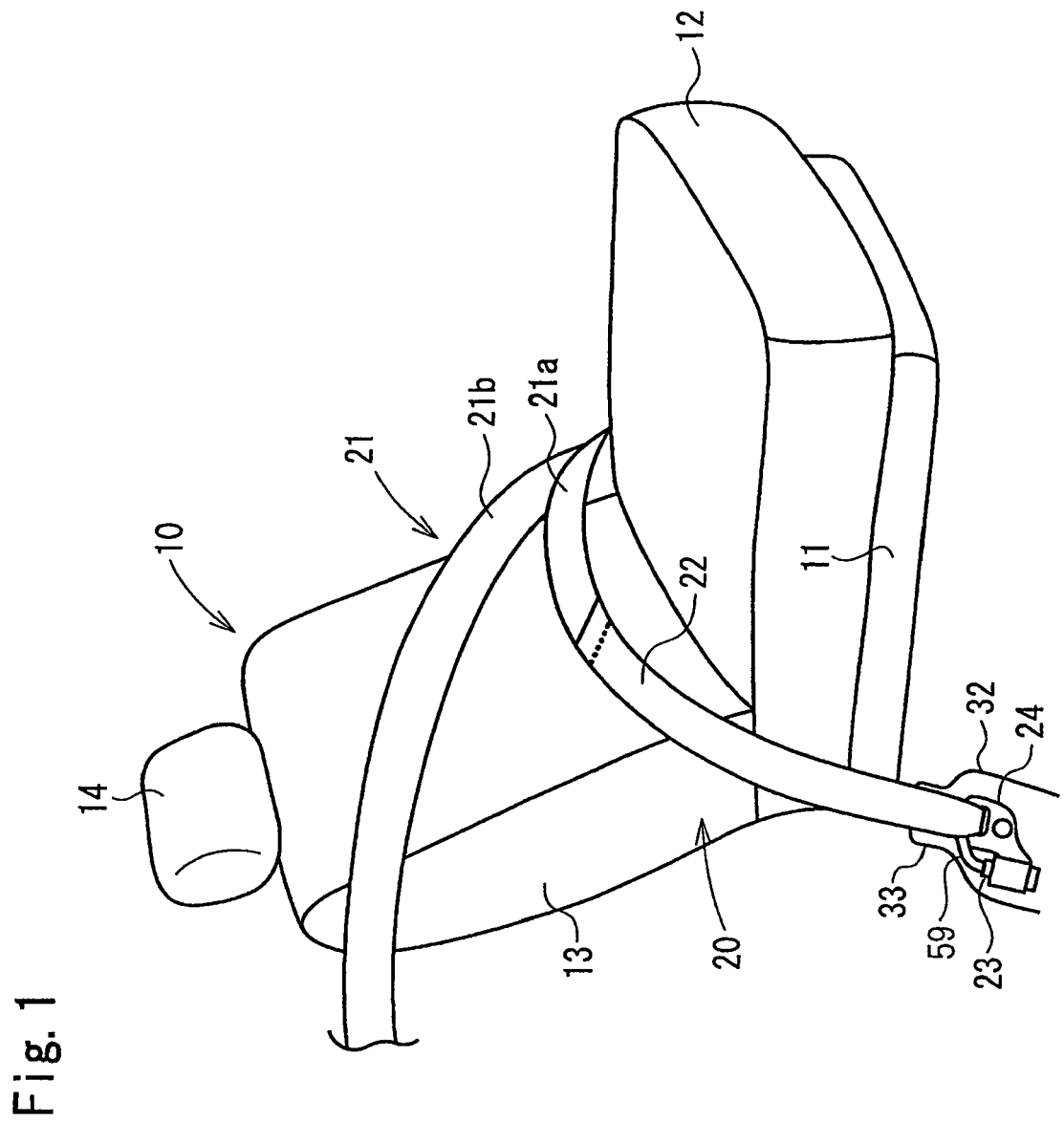
FIG. 1 is a perspective view of a vehicle seat having a vehicle-occupant restraint system according to an embodiment.
Figure 2:
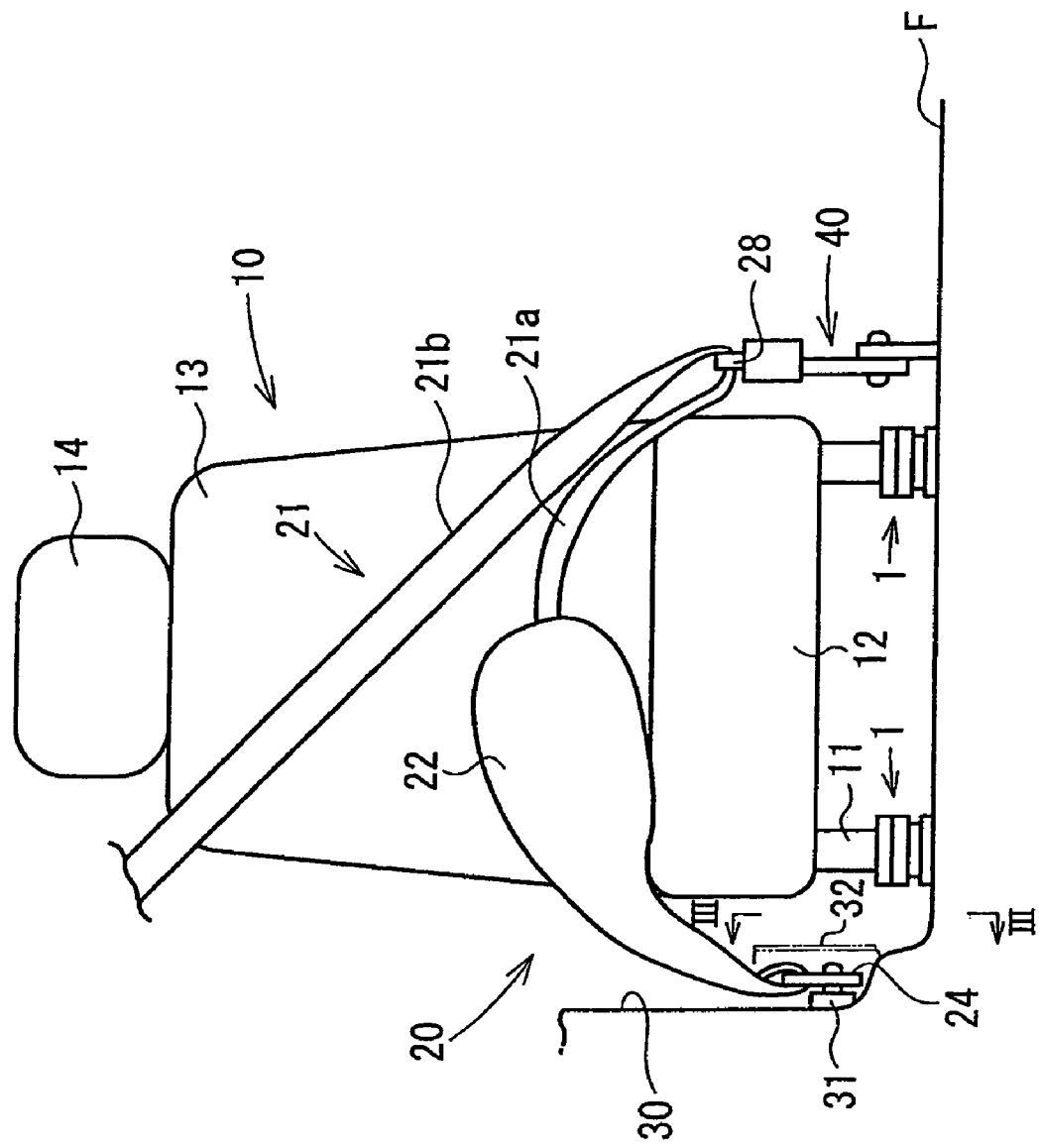
FIG. 2 is a front view of the vehicle seat of FIG. 1.
Figure 3:
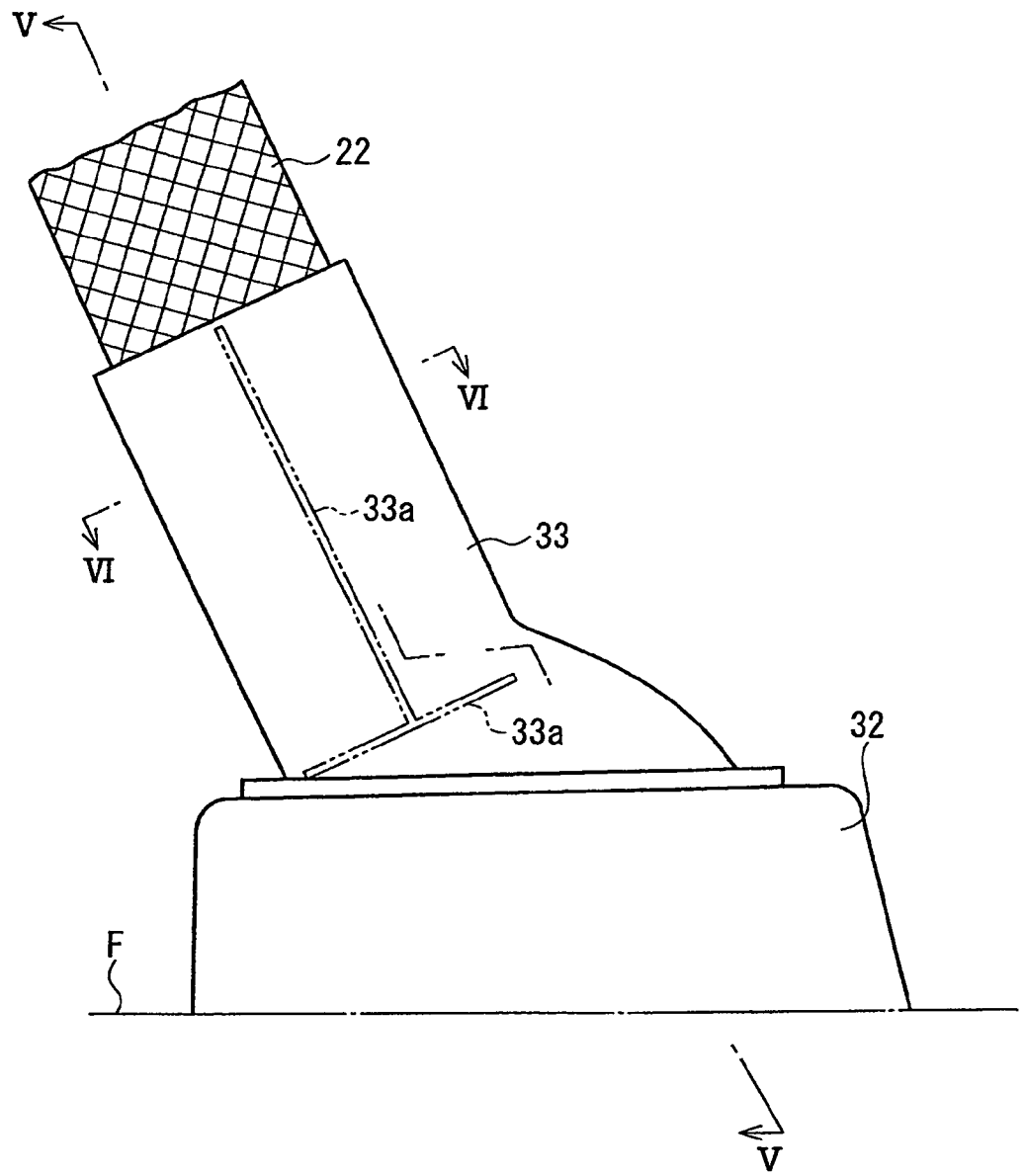
FIG. 3 is a drawing viewed in arrow III-III direction of FIG. 2 during the non-inflation of a lap bag.
Figure 4A:
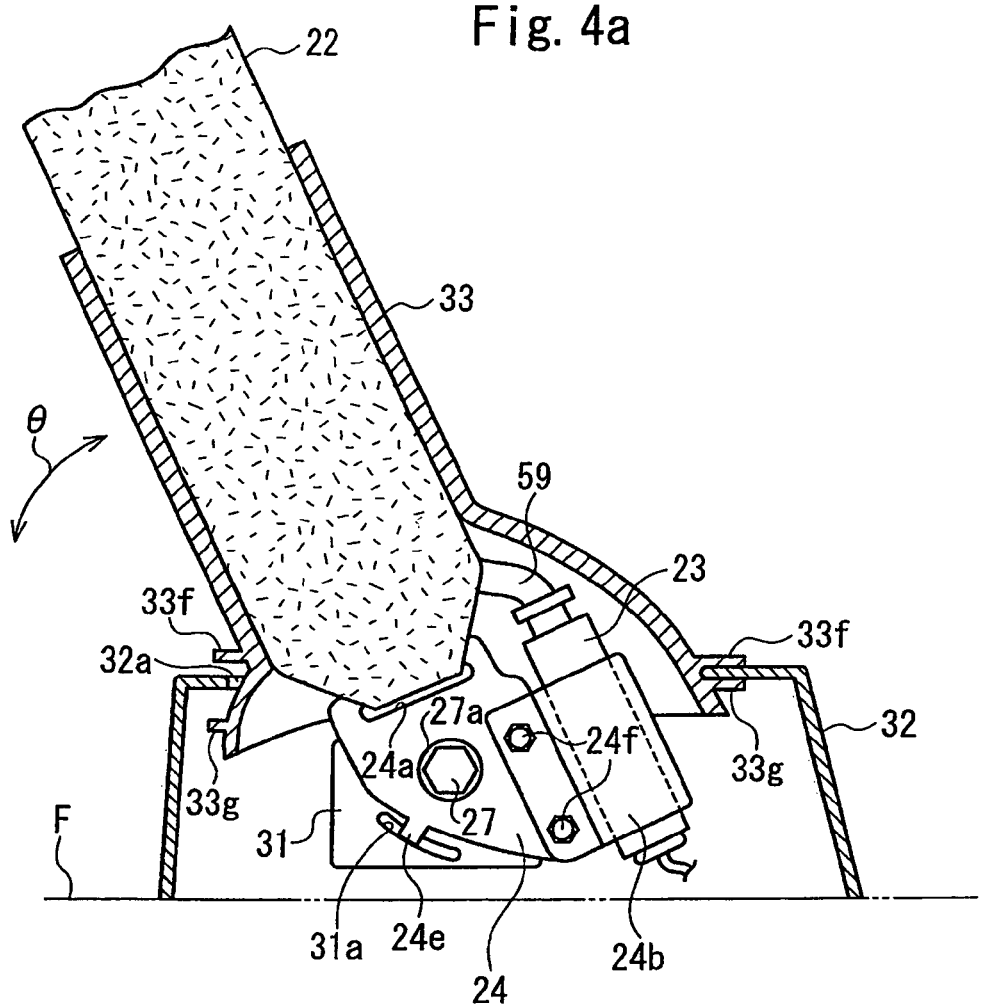
FIG. 4a is a sectional view at the line IV-IV of FIG. 5.
Figure 4B:
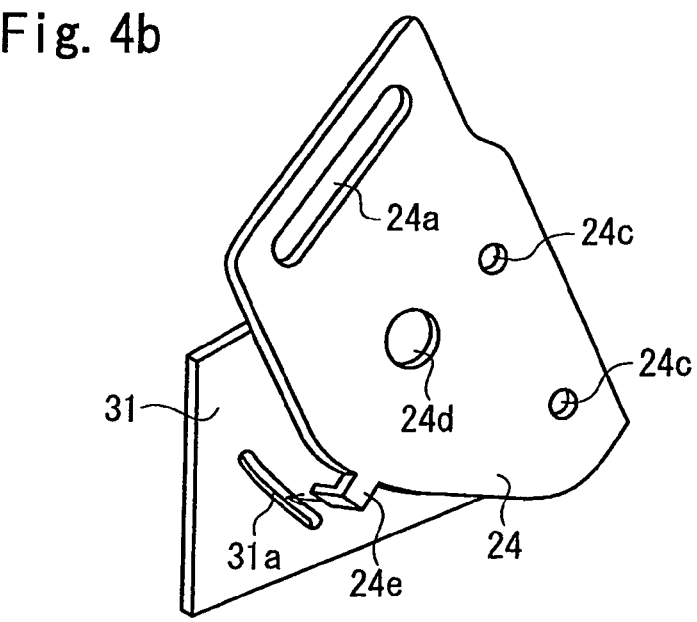
FIG. 4b is a perspective view of an anchor and a pedestal base.
Figure 5:
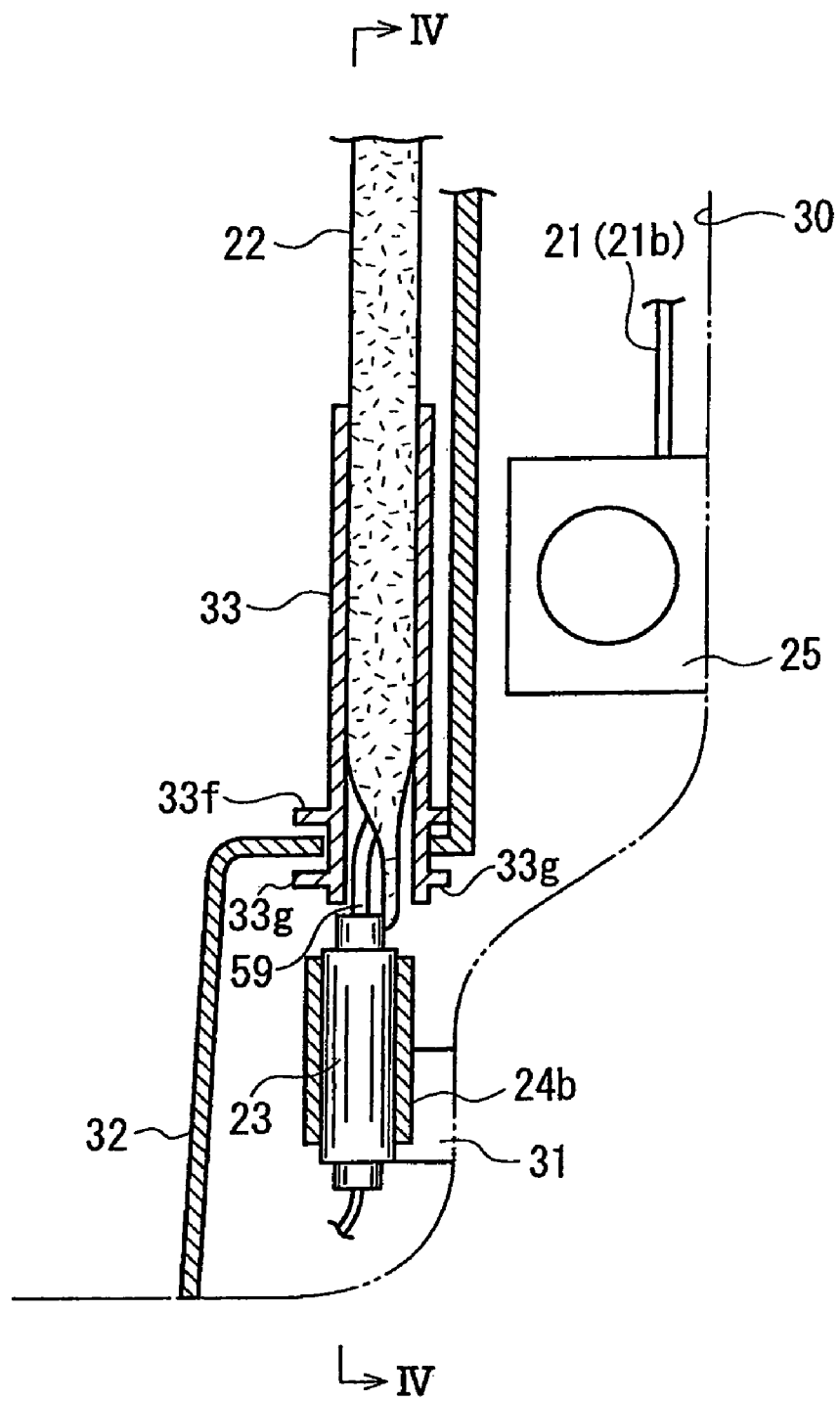
FIG. 5 is a sectional view at the line V-V of FIG. 3.
Figure 6A:
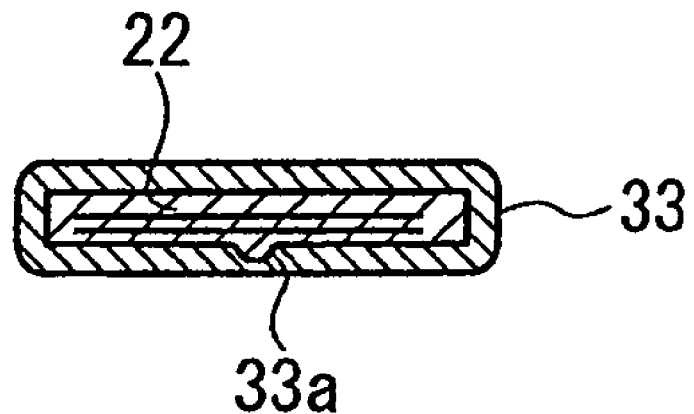
Figure 6B:
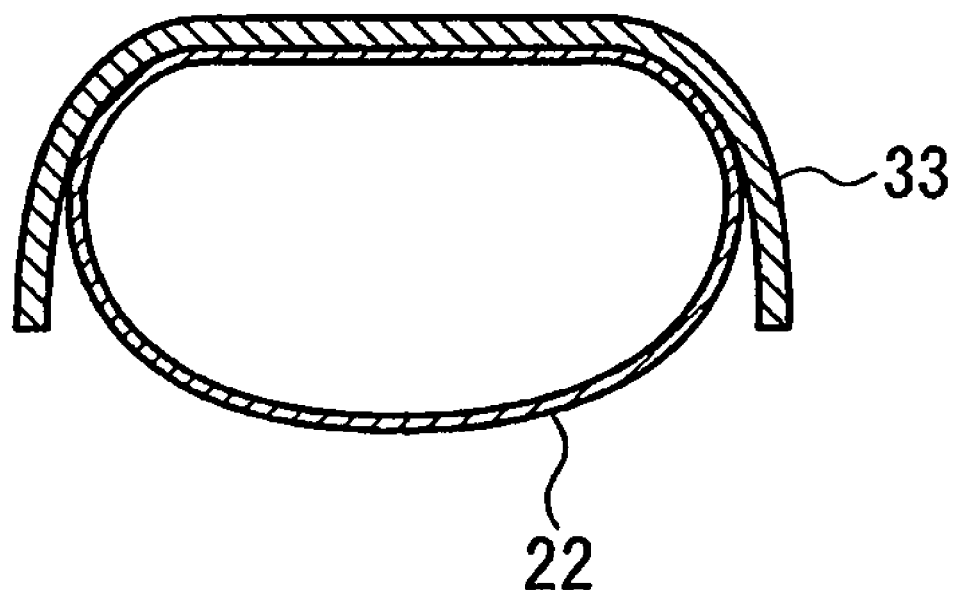
Figure 7:
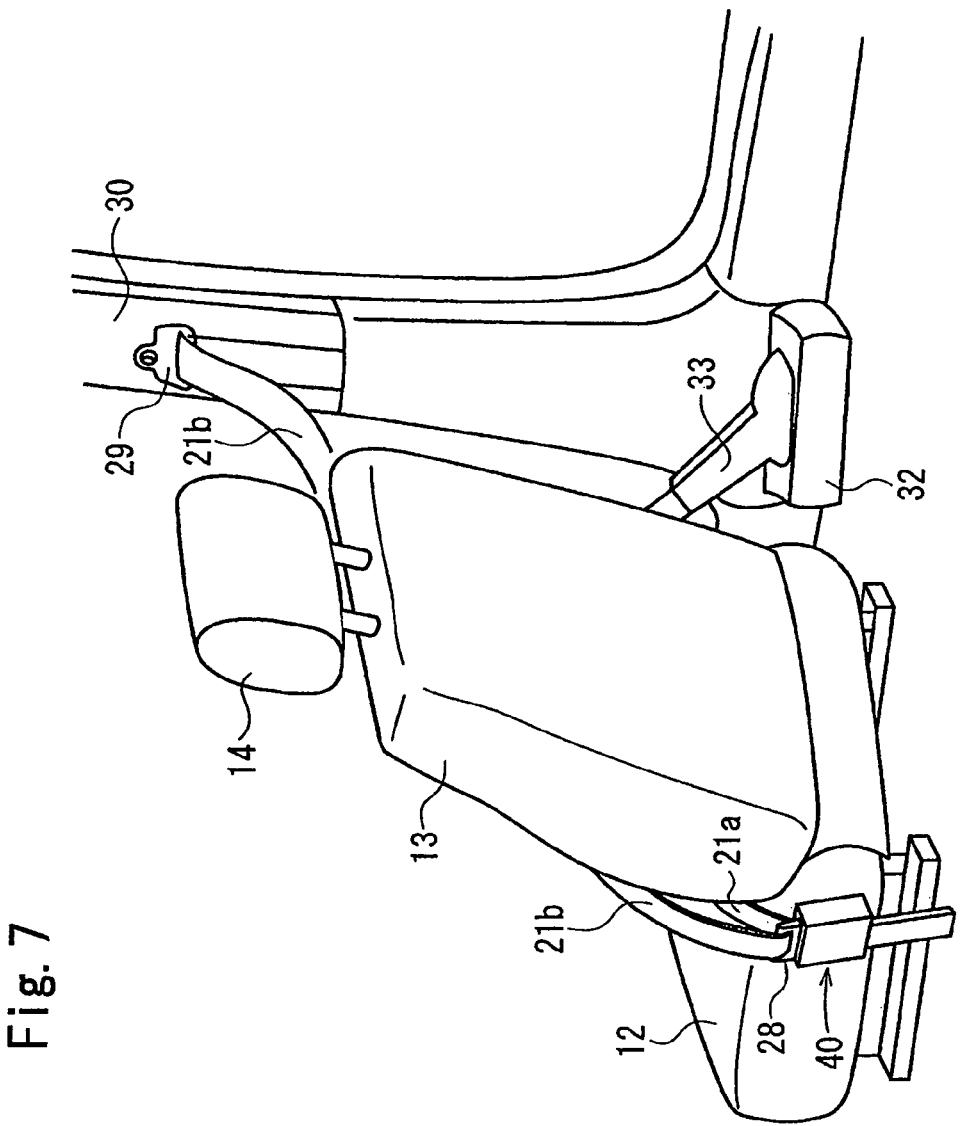
FIG. 7 is a perspective view of the vicinity of the vehicle seat of FIG. 1 viewed from the rear.

FIGS. 1 and 2 are perspective and front views of a vehicle seat having a vehicle-occupant restraint system according to an embodiment, respectively; FIG. 3 is a drawing viewed in arrow III-III direction of FIG. 2; FIG. 4a is a sectional view at the line IV-IV of FIG. 5; FIG. 4b is a perspective view of part of FIG. 4a; FIG. 5 and FIGS. 6a and 6b are sectional views at the line V-V and at the line VI-VI of FIG. 3, respectively; FIG. 7 is a perspective view of the vicinity of the vehicle seat viewed from the rear; and FIGS. 8a and 8b are plan views illustrating the internal structure of a lap bag. FIGS. 2 and 6b show the inflated state of the lap bag; other drawings show the state before inflation of a lap belt; FIG. 8a shows the state of the bag body of the lap bag folded in a strip shape; and FIG. 8b shows the flatly extended state of the bag body.

On a vehicle chamber floor F, a pair of seat rails 1 are extended in parallel in the front-back direction of a vehicle, on which a vehicle seat 10 is arranged movably in the front-back direction of the vehicle.

The seat 10 includes a seat frame 11, a seat cushion 12 placed on the seat frame 11, a seat back 13 arranged to stand from the rear of the seat cushion 12 and to be capable of reclining, and a head rest 14 attached on the top of the seat back 13.

A vehicle-occupant restraint system 20 includes webbing 21 routed along the front of an occupant sitting on the seat 10, an inflatable lap bag 22 constituting the end portion of a lap belt portion 21a (below-mentioned) of the webbing 21, an inflator 23 for inflating the lap bag 22, an anchor 24 for attaching the end of the lap bag 22 to a vehicle body, and a retractor 25 (FIG. 5) for retracting the rear end of the webbing 21.

The webbing 21 is made of a normal non-inflatable belt material. The rear end of the webbing 21 is connected to the seat belt retractor 25 retractably therearound after being hooked through a shoulder anchor 29 arranged in an upper side portion of a vehicle chamber. An intermediate portion of the webbing 21 is hooked through a tongue 28 (FIG. 2).

Along the webbing 21, the side toward the anchor 24 from the tongue 28 becomes the lap belt portion 21a that is routed along front faces of the lower back and the abdominal part of an occupant sitting on the seat 10, while the side toward the shoulder anchor 29 from the tongue 28 becomes a shoulder belt portion 21b that is routed along the front face of the upper body of the occupant.

The rear end (upper ends of FIGS. 3 to 5) of the lap bag 22 is connected to the end of the webbing 21 of the lap belt portion 21a with stitching.

The end of the lap bag 22, as shown in FIG. 4, is inserted into an opening 24a of the anchor 24 and sewn therein, so that the lap bag 22 is connected to the anchor 24.

The lap bag 22 includes a bag body 50, mesh webbing (not shown) surrounding the bag body 50, and a protection cover (not shown) covering the substantial whole mesh webbing and the end portion of the webbing 21.

The bag body 50 is made by overlapping a plurality of pieces of base cloth with the periphery stitched along a seam 50a to have a bag. The rear end of the bag body 50 is sewn to the end of the webbing 21 into a seam 51. As shown in FIG. 8a, the maximum width of the base cloth is larger than the width of the webbing 21. The bag body 50, as shown in FIG. 8b, is made in a strip shape with the substantial same width as that of the webbing 21 by folding back both lateral sides. From the end of the lap belt portion 21a of the bag body 50, a gas introducing duct 59 is extended.

The mesh webbing covers the folded strip-shaped bag body 50. The mesh webbing is made of knitted fabric that can scarcely elongate in the longitudinal direction while can elongate flexibly in width and expanding directions.

The rear end of the mesh webbing is stitched to the vicinity of the end of the webbing 21. The front end of the mesh webbing is connected to the anchor 24 by inserting the front end into the opening 24a of the anchor 24 and folding back it for stitching it at the rear side further than the front end.

The protection cover is made by folding back a narrow rectangular sheet material and by sewing it along a tear seam (not shown) to have a cylindrical shape. The tear seam has a strength to the extent of breaking off when the bag body 50 is inflated.

The protection cover extends from the end of the webbing 21 toward the nearest position to the anchor 24. The rear end of the protection cover covers the stitched portion between the webbing 21 and the mesh webbing, and is sewn to the webbing 21 along the tear seam. The front end of the protection cover covers the front end seam of the mesh webbing; however, it is slightly separated from the anchor 24. The front end of the protection cover is stitched to the mesh webbing along the tear seam. Both the tear seams adjacent to the rear end and the front end of the protection cover have a strength to the extent of breaking off when the bag body 50 is inflated.

According to the embodiment, the anchor 24 is provided with an inflator holder 24b attached thereto with bolts 24f, so that the inflator 23 is supported to the anchor 24 by being embraced around the inflator holder 24b.

To the inflator 23, the gas introducing duct 59 is connected. According to the embodiment, the gas introducing duct 59 is fitted outside the gas nozzle of the inflator 23, and by tightening a band 52 (FIGS. 8a and 8b) around the gas introducing duct 59 from the outside, the gas introducing duct 59 is connected to the inflator 23. Gas is introduced from the inflator 23 into the bag body 50 of the lap bag 22 via the gas introducing duct 59.

A harness 23a (FIGS. 8a and 8b) is connected to an inflator control circuit (not shown) for turning on electricity to an initiator (not shown) of the inflator 23. On the basis of a seizing signal from the inflator control circuit, the initiator is started so that the inflator 23 discharges the gas.

As shown in FIGS. 4 to 6b, the anchor 24 is attached to an anchor-attaching pedestal base 31 disposed in the lower part of the B pillar 30 with a clamp bolt 27.

The anchor 24 is provided with holes 24c to be inserted by the bolts 24f and a hole 24d to be inserted by the clamp bolt 27 formed therein, in addition to the opening 24a.

The anchor 24A is also provided with a protrusion 24e folded up from its periphery in a claw shape. The pedestal base 31 is provided with an arc-shaped slot 31a to be inserted by the protrusion 24e as well as a tapped hole to be screwed by the clamp bolt 27. The slot 31a is an elongated hole extended in an arc shape to have the same radius from the center of the tapped hole for the clamp bolt 27. The protrusion 24e is movable along the slot 31a from its one end to the other end.

A slip washer 27a (FIG. 4a) is interposed between the bolt head of the clamp bolt 27 and the anchor 24. Between the anchor 24 and the pedestal base 31, a slip washer (not shown) is also interposed so that the anchor 24 is rotatably attached to the pedestal base 31. The anchor 24 is swingable within the range of the protrusion 24e movable within the slot 31a.

The anchor 24, the inflator 23, and the lower part of a B pillar are covered with a B pillar cover 32. The lower portion of the lap bag 22 upwardly extended from the B pillar cover 32 is embraced around a belt cover 33.

As shown in FIG. 5, the lower portion of the B pillar cover 32 is bulged toward the vehicle chamber, and an opening 32a is formed on the upper surface of the B pillar cover 32. The lap bag 22 is inserted into the opening 32a. The lower portion of the belt cover 33 is fitted into the opening 32a. The belt cover 33 is provided with flanges 33f and 33g formed on the outer surface of its lower portion, and the marginal part of the opening 32a is interposed between the flanges 33f and 33g.

On the rear side of the belt cover 33, the marginal part of the opening 32a is clamped between the flanges 33f and 33g. The space between the flanges 33f and 33g is increased toward the front side of the belt cover 33, so that the belt cover 33 is swingable in the front-back direction integrally with the anchor 24 and the lap bag 22.

As shown in FIGS. 3 and 6b, the belt cover 33 is provided with tear lines 33a formed thereon, and when the lap bag 22 is inflated, the lap bag 22, as shown from FIG. 6a to FIG. 6b, is cleft along the tear lines 33a.

As shown in FIG. 2, on the side of the seat 10 adjacent to the chamber center, a buckle device 40 is provided for latching the tongue 28. The buckle device 40 may be attached to the seat 10 or may also be arranged on the vehicle chamber floor F.

Although not shown, various sensors are provided on a vehicle having the vehicle-occupant restraint system 20 mounted thereon for detecting a collision (including a side impact, it is the same in the below) of the vehicle or for foreknowing a collision or a lateral turning of the vehicle (both the detection sensor and the foreknowing sensor may also be provided). The inflator control circuit starts the initiator of the inflator 23 based on the detection or foreknown signal from these sensors.

In the vehicle-occupant restraint system configured in such a manner, the end of the lap bag 22 is attached to the B pillar 30 serving as a vehicle side member via the anchor 24, so that the installation of the lap belt onto the vehicle side member is simplified.

According to the embodiment, the inflator 23 is integrated with the anchor 24, so that the inflator 23 can also be easily attached to the B pillar 30.

The anchor 24 and the inflator 23 are also covered with the B pillar cover 32, improving also the appearance.

According to the embodiment, when the front end of the lap bag 22 is swung in the front-back direction of the vehicle body due to the shift of the seat in the front-back direction or the bending forward of an occupant, the anchor 24 and the belt cover 33 also swing in arrow θ direction of FIG. 4a by following the lap bag 22. Therefore, the twisting and the sliding produced at the end of the lap bag 22, in the vicinity of the opening 24a in particular, can be alleviated. As a result, the strength and the wear resistance required for the lap bag 22 are relaxed.

The operation of the vehicle-occupant restraint system is as follows.

When a collision or a lateral turning of the vehicle is detected or foreknown by the sensor, on the basis of the detection signal or the foreknown signal, a seizing signal from the inflator control circuit is entered in the initiator of the inflator 23 so as to start the initiator for discharging gas from the inflator 23. The gas from the inflator 23 is introduced into the lap bag 22 (into the bag body 50) via the duct 29, so that the lap bag 22 (the bag body 50) is inflated while cleaving the belt cover 33 and the protection cover (not shown).

At this time, along with the inflation of the bag body 50 of the lap bag 22, the mesh webbing surrounding the bag body 50 is also inflated; since the mesh webbing is knitted so that it is scarcely elongated in the longitudinal direction while can elongate flexibly in width and expanding directions, when the mesh webbing is inflated, its length is shortened. Thereby, tension is applied to the webbing 21, so that the lap belt portion 21a (including the lap bag 22) is brought into tight contact with the body of an occupant so as to securely restrain the occupant to the seat 10 while the impact applied to the lower back or the abdominal part of the occupant is absorbed by the inflated lap bag 22.

The embodiment described above shows an example of the present invention, so that the invention is not limited to the embodiment. For example, the protrusion 24a may also be provided in the pedestal base 31 and the slot 31a may also be provided in the anchor 24. Instead of the slot 31a, protrusions may be provided in vicinities of both ends of the slot 31a, so that the protrusion 24e is movable between the projections for restricting the swingable range.

According to the embodiment, the anchor 24 is attached to the lower portion of the B pillar 30; alternatively, it may be arranged on the vehicle chamber floor F.

According to the embodiment, the inflator 23 is attached to the anchor 24; alternatively, it may also be attached to the pedestal base 31, the seat frame 11, or the vehicle cabin floor 14F.

Figure 9A:
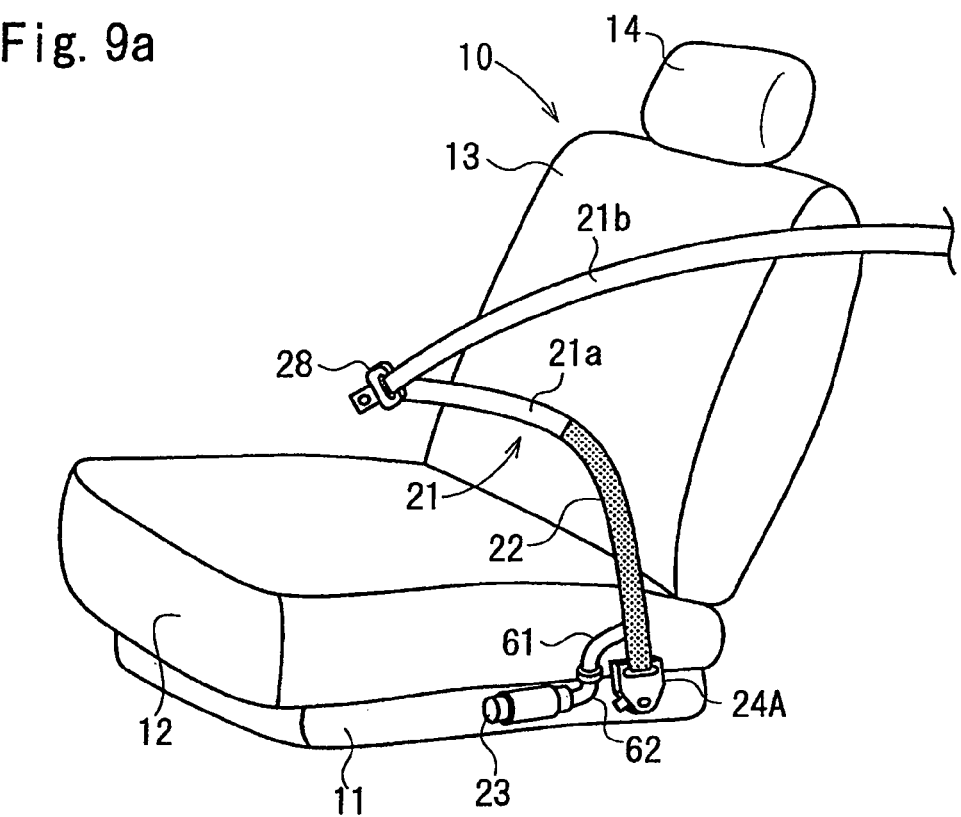
Figure 9B:
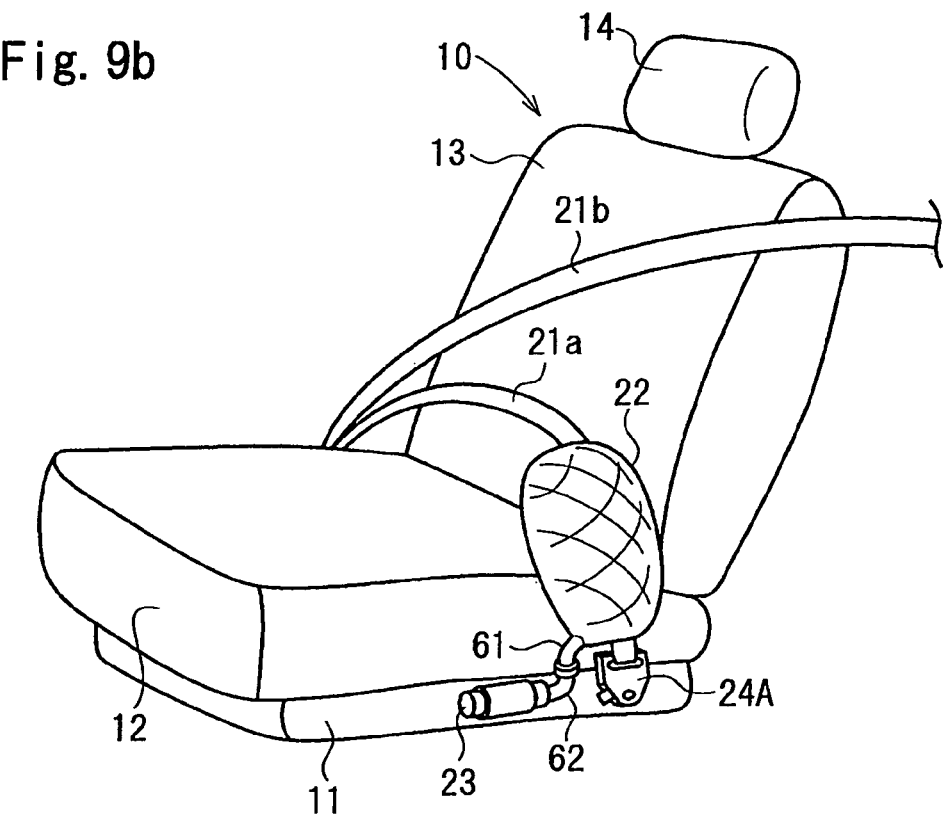
Figure 10:
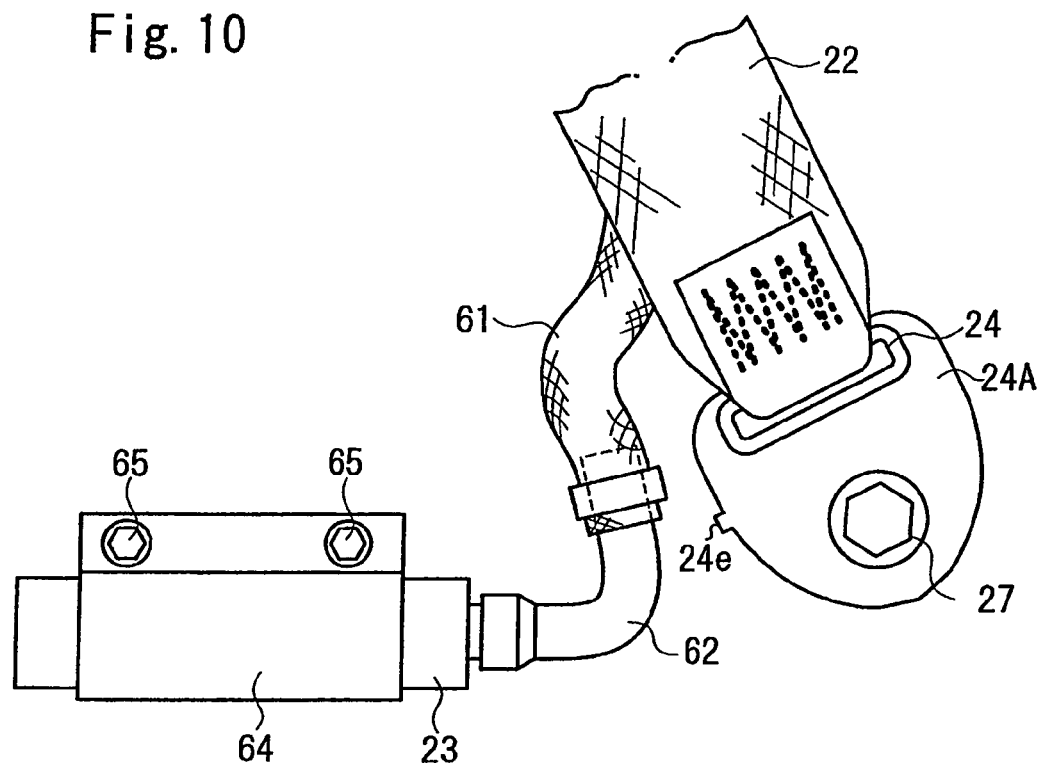

FIGS. 9a, 9b, and 10 show an example of the above in that a cylindrical gas inlet 61 extended from the lap bag 22 is connected to the inflator 23 via a pipe 62. An anchor 24A is swingably attached to the seat frame 11 with the clamp bolt 27. A projection 24e (see FIG. 10) of the anchor 24 is inserted into a slot (not shown) provided in the seat frame 11 so that the swinging range is restricted.

The inflator 23 held by an inflator holder 64 is attached to the seat frame 11 with bolts 65. Other configurations of the vehicle-occupant restraint system shown in FIGS. 9a, 9b, and 10 are the same as those of the embodiment described above, so that like reference characters designate like common components.

According to the embodiment shown in FIGS. 9a, 9b, and 10, the inflator 23 may also be held on the anchor 24A.

Figure 11:
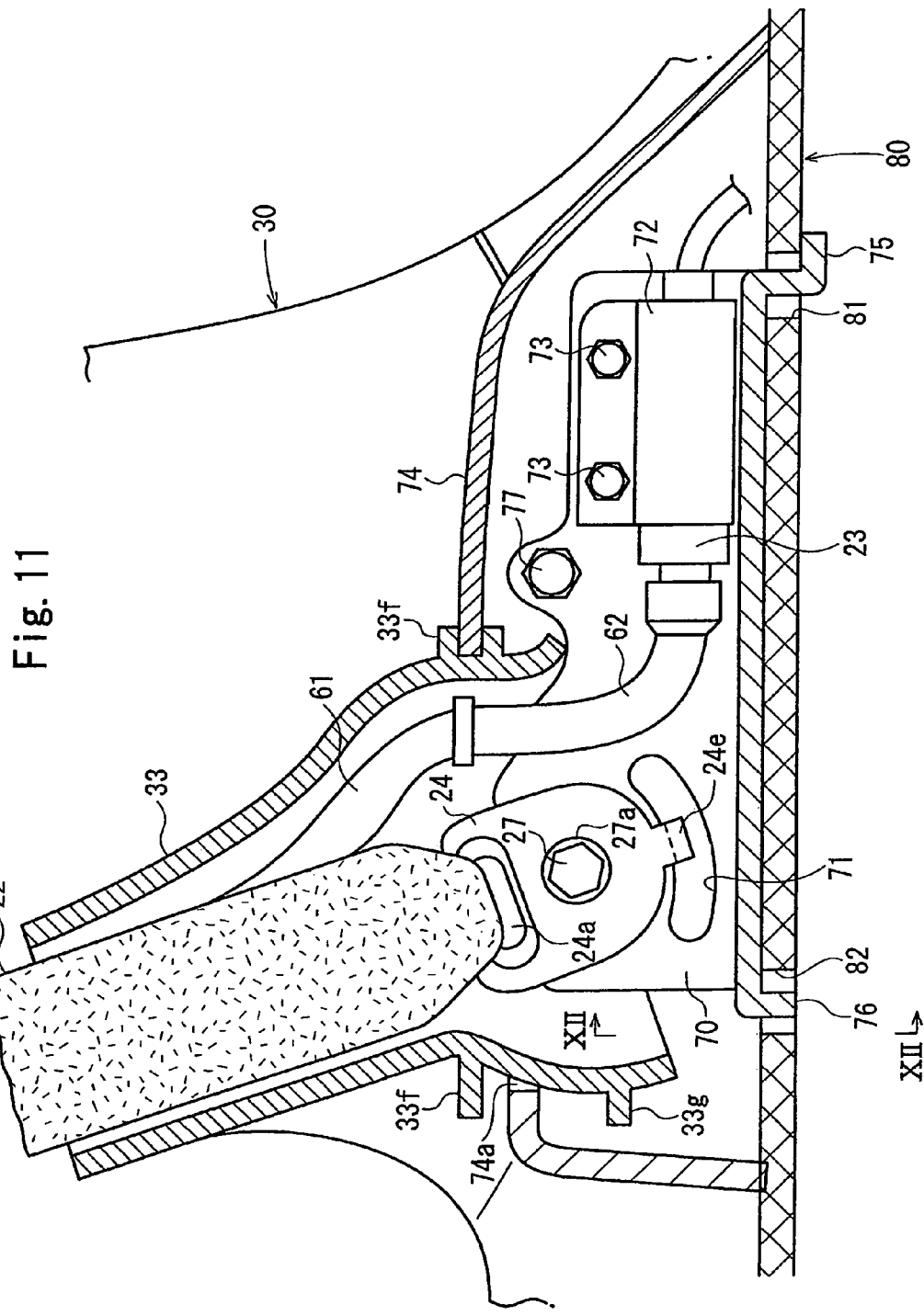
FIG. 11 is a longitudinal sectional view of a vehicle-occupant restraint system according to another embodiment in the vicinity of an anchor and in the front-back direction of a vehicle body.
Figure 12:
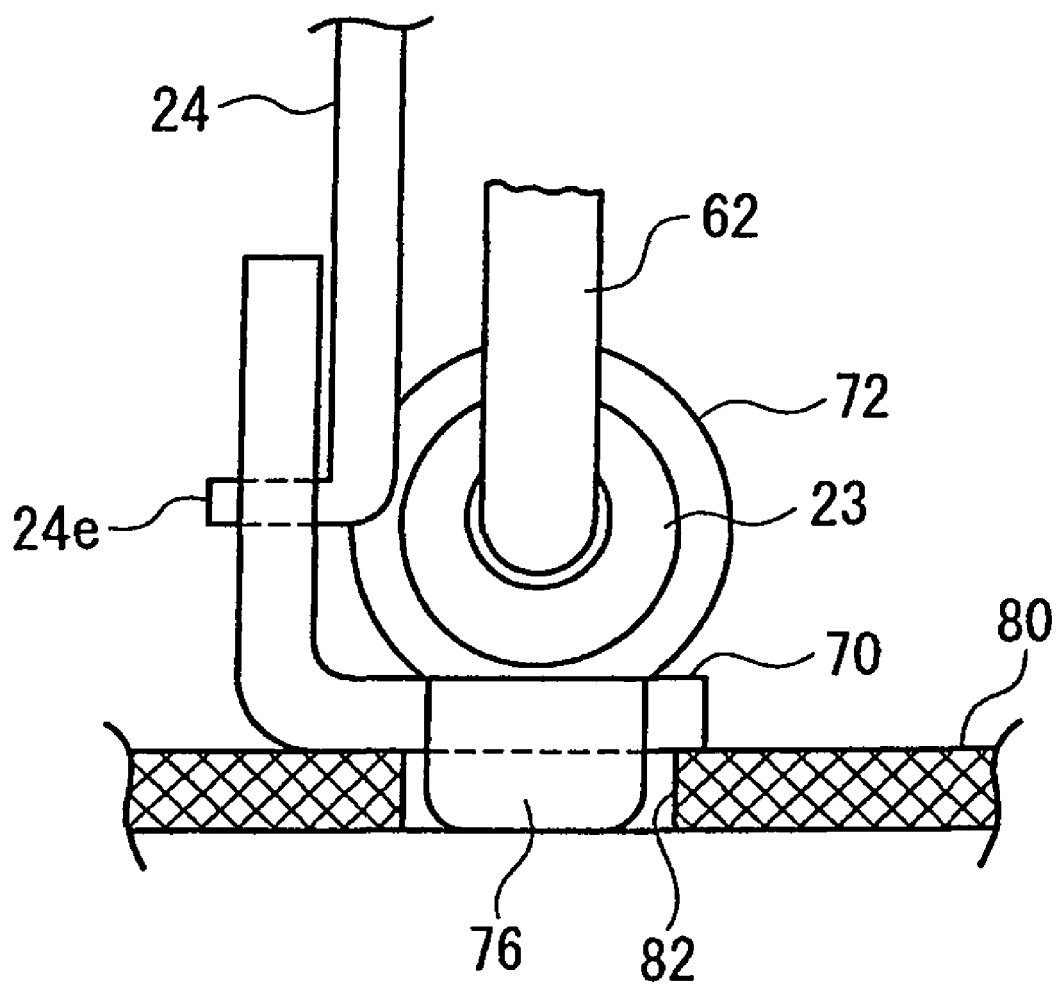
FIG. 12 is a sectional view at the line XII-XII of FIG. 11.

FIGS. 11 and 12 show that a bracket 70 is arranged on a vehicle body floor 80, and the anchor 24 is swingably attached to the bracket 70 with the clamp bolt 27 while the swinging range of the anchor 24 is restricted with the protrusion 24e and a slot 71.

The inflator 23 is attached to the bracket 70 via an inflator holder 72 and bolts 73. The lap bag 22 is connected to the inflator 23 via the gas inlet 61 and the pipe 62.

The bracket 70 is covered with a B pillar cover 74. The lap bag 22 is inserted into an opening 74a of the B pillar cover 74. The vicinity of the end of the lap bag 22 is covered with the belt cover 33. The configurations of the belt cover 33 are the same as those of the embodiment described above, so that like reference characters designate like common components.

The bracket 70 is provided with a hook part 75 with a crank-shaped section formed at the rear end and a projection 76 formed at the front end. The hook part 75 is brought into engagement with an opening 81 of the floor 80 while the projection 76 is brought into engagement with an opening 82 of the floor 80 so as to position the bracket 70. The bracket 70 is fixed to the B pillar 30 with a bolt 77.

According to the embodiment, the vehicle-occupant restraint system for a driver's seat is exemplified; the present invention can be obviously incorporated in other seats such as a passenger's seat.

The present invention has been described in detail with a specific embodiment; however, it is apparent to one skilled in the art that various modifications can be made without departing from the spirit and scope of the present invention.

This application is made based on Japanese Patent Application filed on 16$^{th}$ day of Dec. 2005 (Japanese Patent Application No. 2005-363692) and its whole application can be incorporated-by reference.

The invention claimed is:

1. A vehicle-occupant restraint system, comprising:
a base adapted to be attached to a vehicle part, an anchor attached to the base swingably in a front-back direction of a vehicle, an inflator attached to the base or anchor, a lap belt attached to the anchor at one end thereof and including an inflatable part connected to the inflator to receive gas from the inflator when the inflatable part is inflated, a first cover adapted to be attached to the vehicle part to cover the base, the anchor and the inflator, said first cover having an upper opening through which the lap belt passes to be connected to the anchor, and a second cover covering the upper opening and a part of the lap belt, said second cover having an upper flange and a lower flange spaced from the upper flange to define a space therebetween so that a marginal part of the upper opening is interposed therebetween, said space increasing toward a front side of the second cover so that the second cover is swingable in the front-back direction integrally with the anchor and the lap belt within a predetermined angular range.

2. The vehicle-occupant restraint system according to claim 1, wherein the lap belt comprises a webbing made of a non-inflatable belt material, and the inflatable part fixed to an end of the webbing to extend further therefrom without substantially overlapping with the webbing and attached to the anchor, said inflatable part having a bag shape and made of a knitted fabric that does not substantially elongate in a longitudinal direction but does elongate in a width direction perpendicular to the longitudinal direction.

3. The vehicle-occupant restraint system according to claim 2, wherein said second cover includes a tear line to open laterally when the lap belt portion is inflated.

4. The vehicle-occupant restraint system according to claim 1, wherein the base is a bracket having a hook part with a crank-shaped section at one end and a projection at the other end, the hook part and the projection being adapted to be engaged with holes of the vehicle.

5. The vehicle-occupant restraint system according to claim 1, wherein a projection is provided in one of the anchor and the base while an arc-shaped part to be engaged with the projection is provided in the other of the anchor and the base so that the anchor is swingable within a movable range of the projection in the arc-shaped part.

6. The vehicle-occupant restraint system according to claim 1, wherein the base is attached to one of a B pillar, a seat frame, and a vehicle chamber floor of the vehicle body.

* * * * *